(12) United States Patent
Allen et al.

(10) Patent No.: US 11,083,649 B1
(45) Date of Patent: Aug. 10, 2021

(54) MOBILE MEDICAL SERVICES SYSTEM

(71) Applicants: Sean Allen, Raleigh, NC (US); Jerusha Allen, Raleigh, NC (US)

(72) Inventors: Sean Allen, Raleigh, NC (US); Jerusha Allen, Raleigh, NC (US)

(*) Notice: Subject to any disclaimer, the term of this patent is extended or adjusted under 35 U.S.C. 154(b) by 0 days.

(21) Appl. No.: 16/905,910

(22) Filed: Jun. 18, 2020

(51) Int. Cl.
- *A61G 3/00* (2006.01)
- *B60P 3/34* (2006.01)
- *A61G 10/00* (2006.01)

(52) U.S. Cl.
CPC .............. *A61G 3/001* (2013.01); *B60P 3/34* (2013.01); *A61G 10/00* (2013.01)

(58) Field of Classification Search
CPC ........ A61G 3/001; A61G 3/02; A61G 3/0209; A61G 3/002; A61G 3/062; A61G 99/00; A61G 10/00
USPC ...................................................... 296/24.38
See application file for complete search history.

(56) References Cited

U.S. PATENT DOCUMENTS

| | | | | |
|---|---|---|---|---|
| 4,570,733 A * | 2/1986 | Star | ........................... | B60P 3/14 180/41 |
| 7,980,511 B2 * | 7/2011 | Janboecke | ............. | B64D 11/00 244/118.5 |
| 9,796,473 B2 * | 10/2017 | Saint-Jalmes | .......... | B64D 11/00 |
| 9,836,988 B2 * | 12/2017 | Harrison | ................... | G09B 9/00 |
| 10,213,351 B2 * | 2/2019 | Thompson | ........... | A61B 6/0407 |
| 2002/0135193 A1 * | 9/2002 | Shaw | ........................ | B60P 3/14 296/24.38 |
| 2011/0115245 A1 * | 5/2011 | Engelbrecht | ............. | A61G 1/02 296/19 |
| 2015/0209223 A1 * | 7/2015 | Richmond | ................ | B60P 3/14 4/506 |
| 2015/0225973 A1 * | 8/2015 | Patoine | ..................... | E04H 1/12 244/118.2 |
| 2018/0133074 A1 * | 5/2018 | Delise | ..................... | A61G 3/063 |
| 2018/0339184 A1 * | 11/2018 | Dreytser | ................ | A63B 21/16 |

* cited by examiner

*Primary Examiner* — Dennis H Pedder

(57) ABSTRACT

The present invention relates to a system for delivering medical services in a mobile setting that includes a frame assembly, where said frame assembly is mounted to an enclosed portable compartment. The frame assembly forms an examination and therapy area for administering a multitude therapy modalities. The therapy area includes a plurality of tables convertibly and plurality of cabinets integrated into the frame assembly. A grouping of training equipment removably engages with the frame assembly related to various therapy techniques. The enclosed portable compartment may be an interior of a van or an interior of a portable pod.

8 Claims, 8 Drawing Sheets

MOBILE MEDICAL SERVICES SYSTEM

BACKGROUND OF THE INVENTION

Field of Invention

The present invention relates to a modular, self-contained, mobile medical service system, designed to transport medical services to a patient at a remote location.

Description of Related Art

Allied health professionals deliver a plethora of medical services to patients. When speaking of allied health professionals, the following provides an exemplary list: dental hygienists, diagnostic medical sonographers, dietitians, medical technologists, occupational therapists, physical therapists, radiographers, respiratory therapists, and speech language pathologists. Each of these professional use various equipment and medical devices to administer specific services, tests and treatment to patients. Most of these services are delivered in clinics, hospitals or other health facilities, thus requiring patients to find transportation to the allied health professional.

Physical therapists (PTs) are allied health professionals who operate as movement experts. PTs attempt to the optimize a patient's quality of life through prescribed exercise, hands-on care, and patient education. PTs conduct individualized, comprehensive examinations of movement-related disorders, set client-specific goals and develop a treatment plan to achieve set goals, using techniques that promote the ability to move, reduce pain, restore function, and prevent disability. The choice of intervention strategy used is based on individual therapist clinical judgement, depending on specific patient population and available resources. Some of the foundational intervention techniques used can be categorized as therapeutic exercise, functional training, manual therapy, physical modalities, motor function training.

Equipment needs for physical therapists, as with other health professionals, vary based on patient population, specialty area or work setting. Settings along continuum of care in the United States include acute care(hospital), inpatient rehab, home health and outpatient. Some essential pieces of equipment necessary to carry out a thorough PT exam and treatment for the outpatient setting include, but not limited to, an exam/treatment table, parallel bars, Multi-purpose, multi-joint, adjustable resistive machine, adjustable height exercise steps and modalities of choice (ex: heat, ice, electrical stimulation, etc.). A harness system is found in some clinics for safety reasons due to complexity of clients however this is not always present as many clinics have a rehab technician present to assist as needed.

Traditional allied health equipment in a stand-alone clinic is bulky, heavy and typically archaic in design. If someone were to take the key pieces of therapy equipment in a standard outpatient clinic and cram them into a mobile vehicle, the vehicle would probably be the size of a large recreational vehicle or city bus. As a consequence, it is an object of the present invention to provide a mobile medical service system which can travel to patients or placed temporarily near patients to administer allied health services.

SUMMARY OF THE INVENTION

The present invention relates to a mobile medical services system that includes a frame assembly adapted for mounting into an interior cabin of a van compartment. A plurality of tables and cabinets may be convertibly integrated into the frame assembly. Along with the tables and cabinets a grouping of training equipment may be removably engaged with the frame assembly to administer therapy modalities to patients. One goal of the present invention is to create a customer design equipment geared to towards the following disciplines of physical and occupational therapy: general, pediatrics, geriatrics and occupational medicine. Further other applicable professions that may use this system include chiropractic medicine, prosthetics, Pilates, yoga and personal training.

The present invention provides modular medical services equipment adapted to fit into any air conditioned, high-roof, cargo van or a portable air-conditioned cargo container, which may be transported to a remote location. The frame assembly and other components may be mounted to a floor and/or a wall using attachment devices and is consequently self-contained. The present invention further includes an auxiliary power source, wherein AC and/or DC power wires extend from an auxiliary battery (DC) and invertor (AC), through the frame assembly or under the floor, which will descend or ascend into each cabinet.

An additional feature of the present invention may include a treatment table that may be disengaged from the frame assembly in order to transport a patient into the therapy area. In some instances, a patient may be unable to ambulant to the mobile medical service area, such as if the patient's driveway is too steep or the patient is too weak to get out of their home.

DETAILED DESCRIPTION

Figure 1:
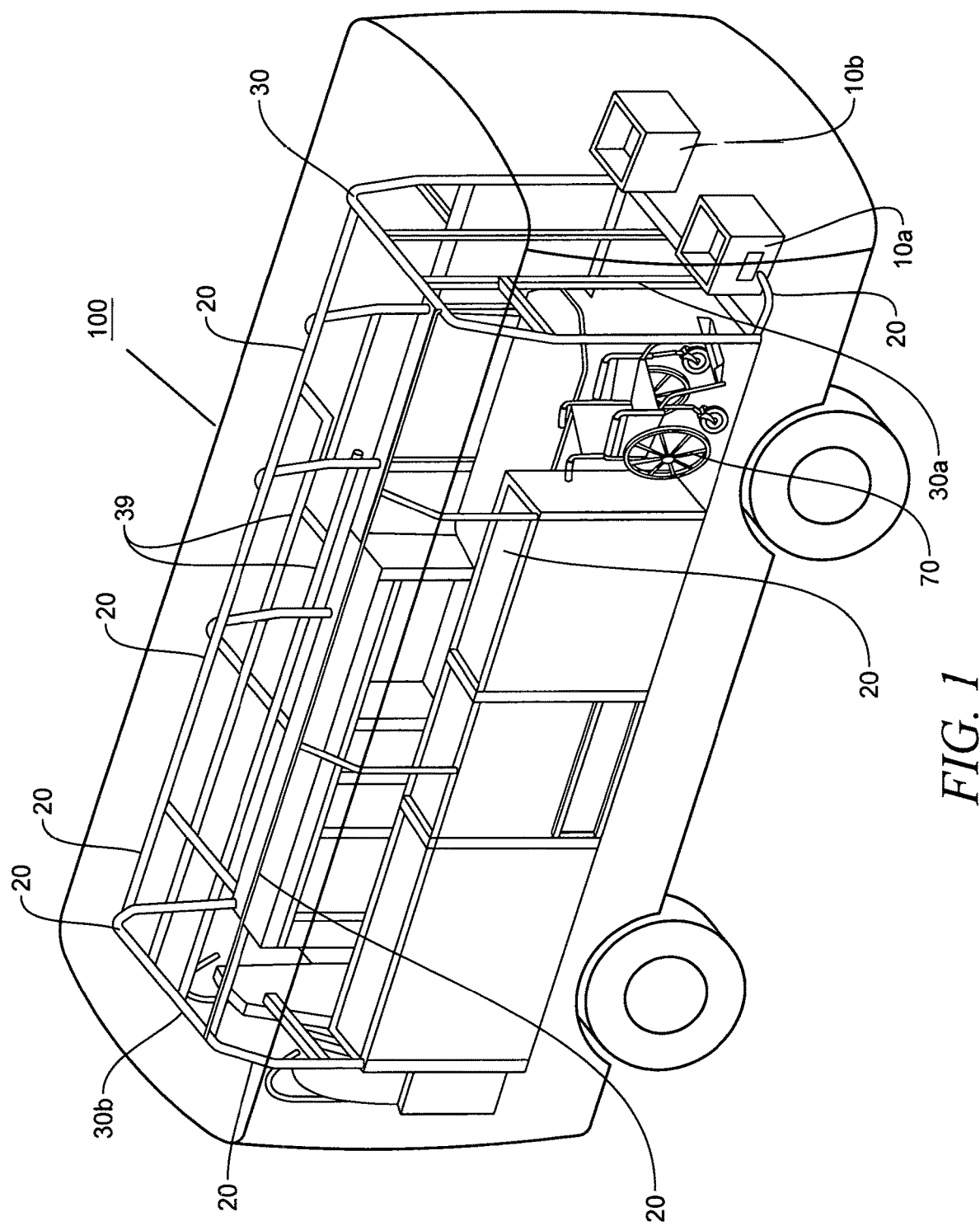
FIG. 1 depicts a perspective view of a mobile medical services system according to the present invention.

As shown in FIG. 1, a perspective view of a mobile medical services system according to present invention is depicted. This system includes a frame assembly 30 that extends overhead and encloses the therapy area at each end. Preferably, the frame assembly 30 is adapted for mounting within an enclosed portable compartment 100, where the enclosed portable compartment 100 may include an interior cabin of a van, a medical coach, a trailer or portable pod. The frame assembly 30 includes an entry end 30b and a distal end 30a. The frame assembly 30 includes an entry end 30b and a distal end 30a. Cabinets are provided within the therapy area, and a power source 10a is provided with an additional power source opening 10b. Wiring is provided over the outside perimeter of the frame 30. The power source 10a preferably includes an auxiliary battery (DC) and invertor (AC). This wiring provides a means to connect power to the interior of the therapy area, where connections may be provided in each cabinet and other particular locations within the therapy area. At the top of the frame assembly 30 is a tracking system 39. The tracking system 39 allows cables and pulleys to be attached thereto to assist the therapist in administering therapy within the system.

Figure 2:
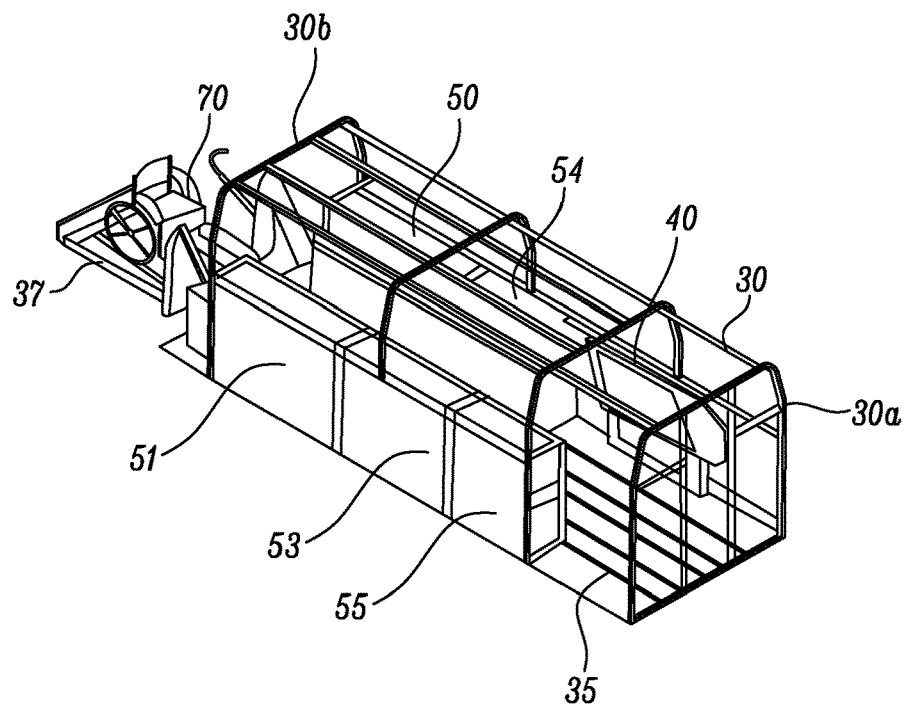
FIG. 2 depicts a second view of the mobile medical services system without power sources.
Figure 3:
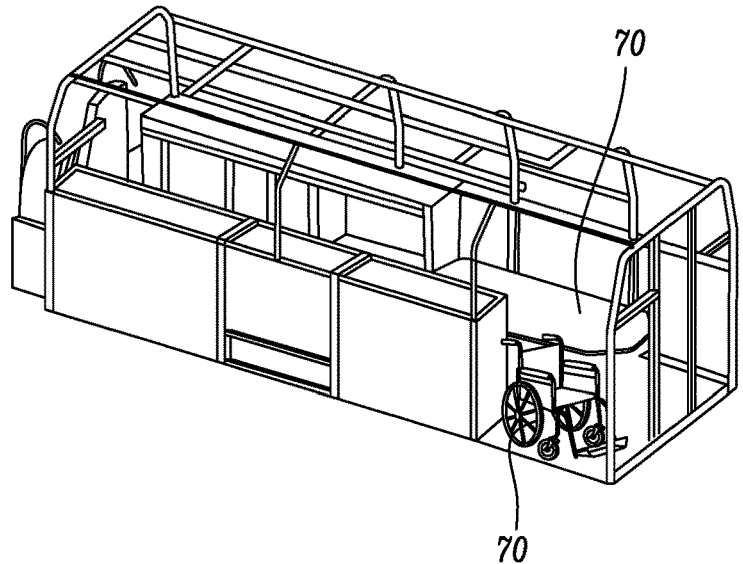
FIG. 3 depicts the mobile medical services system with the wheelchair lift in an upward position.

FIGS. 2 and 3 depict the frame assembly 30 with a view of the positioning of a wheelchair 70. A wheelchair lift 37 is provided at the entry end 30b of the frame assembly 30, where the wheelchair lift 37 enables placement of the wheelchair 70 onto a floor 35 of the enclosed medical services system. As noted in FIGS. 2 and 3, cabinets 51, 53 and 55 are provided on one side of the frame assembly 30 and cabinets 50, 54 on the opposing side. Adjacent to cabinet 54 is an examination table 40 shown in an upright position in FIG. 2 and in a horizontal position in FIG. 3. As shown, the wheelchair 70 may be placed next to the examination table 40 to allow for easy placement of the patient onto the examination table 40 and for convenient storage of the wheelchair 70 during a therapy session. The wheelchair lift 37 is shown in a vertical position in FIG. 3, therefore providing a storage position for the wheelchair lift 37 and enclosure of the therapy area. The support bars are shown on the interior side of the cabinets 50, 54.

Figure 4:
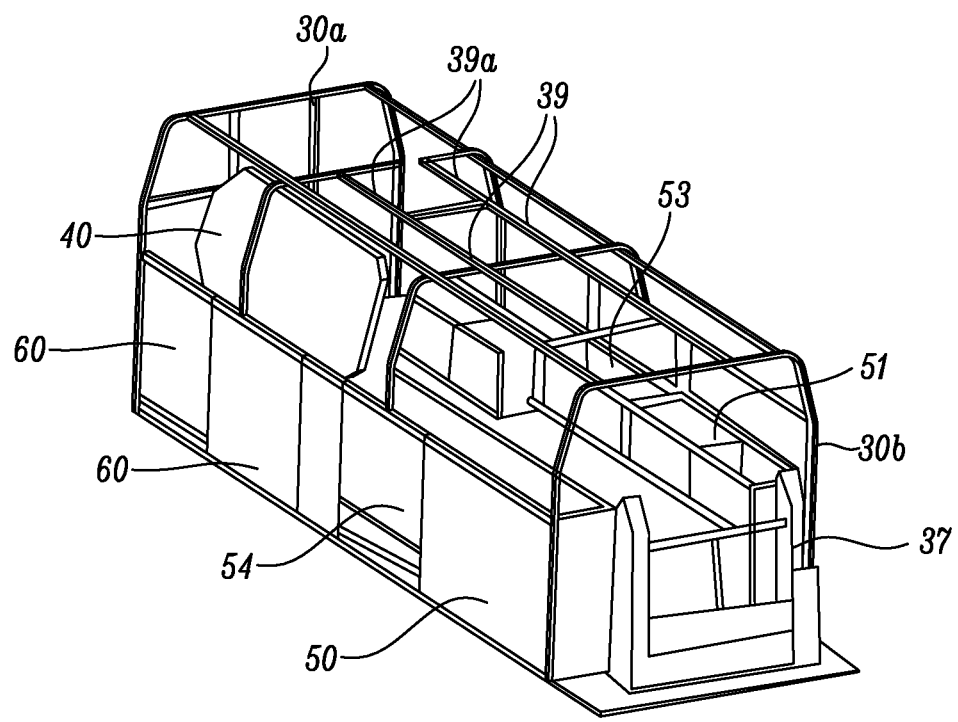
FIG. 4 depicts an opposite view of the mobile medical services system with the wheelchair lift in an upward position.

FIG. 4 shows a reverse view of the medical services system according to present invention where the entry end 30b is shown in the foreground with the wheelchair lift 37. As stated above, the wheelchair lift 37 includes a vertical position and a horizontal position, wherein the vertical position encloses the therapy area and the horizontal position enables movement of the wheelchair 70 between the ground level and the floor of the therapy area. An outside view of cabinets 50, 54 is shown with side panels 60 adjacent to the outer edge of the examination table 40. Also, in this view, cabinets 51, 53 are shown open to provide access to the interior compartment thereof. These interior compartments may be used for storage purposes and also for storage purposes, such as additional accessories and equipment to assist in the delivery of medical services to a patient within the mobile modular system.

Figure 5A:
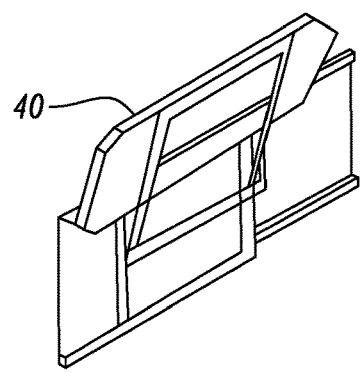
FIG. 5A depicts an exam table used with the mobile medical services system according to the present invention.
Figure 5B:
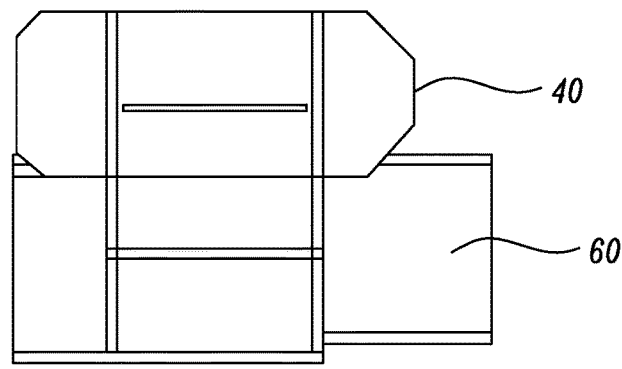
FIG. 5B depicts the exam table in an upward position.
Figure 5C:
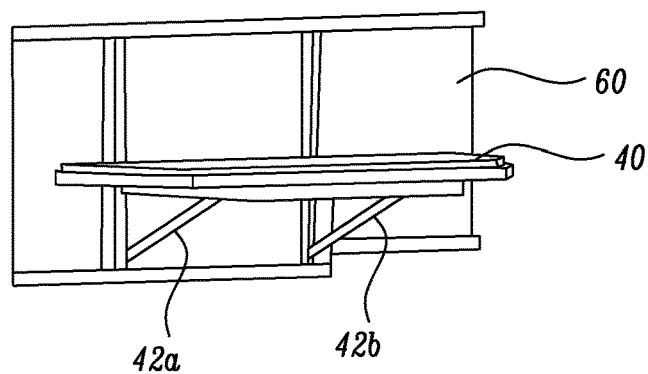
FIG. 5C depicts the exam table in a reclined position.

FIG. 5A shows the examination table 40 in an upright vertical position. This upright vertical position is the preferred storage position of the exam table 40. A front view of this position is shown as FIG. 5B. The examination table 40 is shown in a horizontal position in FIG. 5C and support bars 42a, 42b are shown, which provide support for the examination table 40 when in this position.

Figure 6:
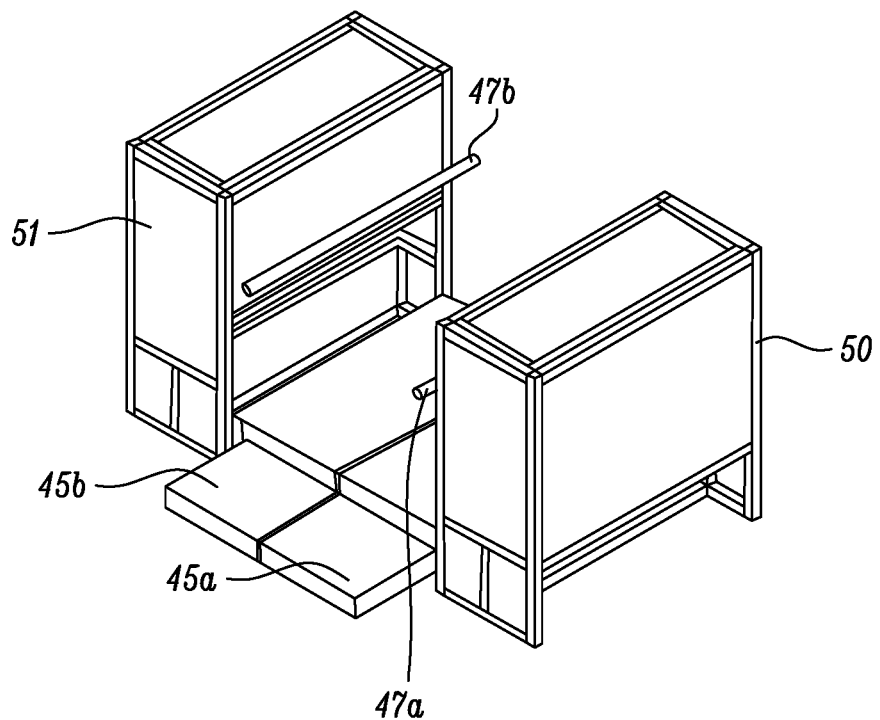
FIG. 6 depicts a first view of exemplary cabinets used with the mobile medical services system according to the present invention.
Figure 7:
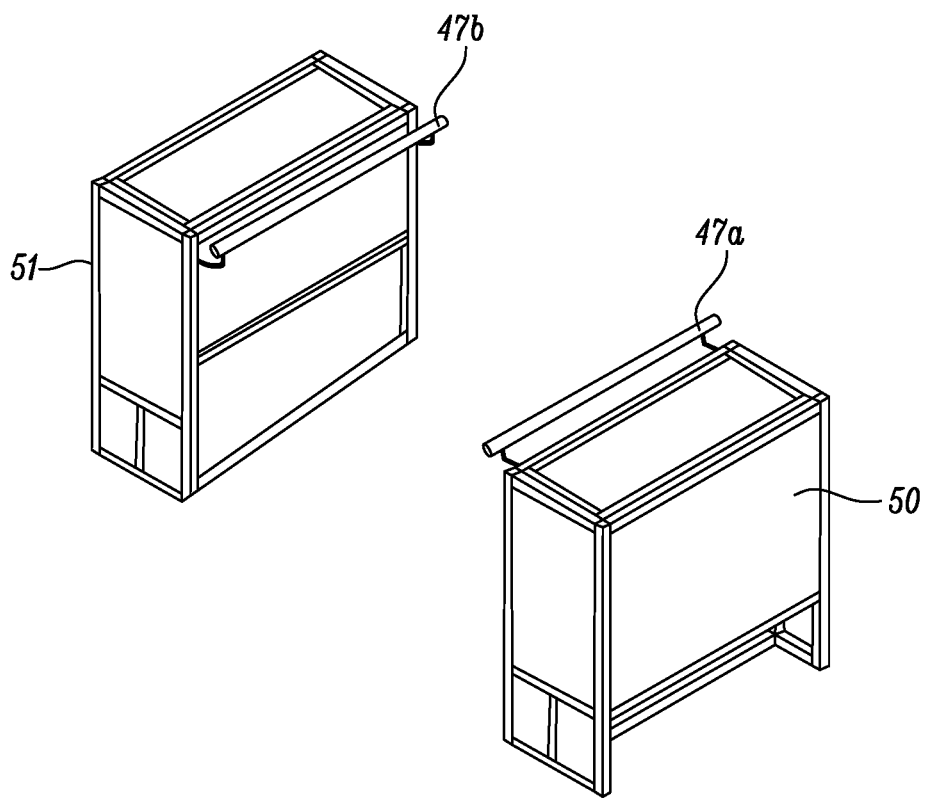
FIG. 7 depicts second view of exemplary cabinets used with the mobile medical services system.

A portion of the examination space is depicted in FIG. 6. Cabinets 51, 50 are shown with a step assembly 45a, 45b depicted. These steps are normally enclosed within these cabinets 51, 50 but may be released to assist the healthcare provider to assist the patient in performing therapy and exercises related to stair training. The step heights may be varied and handle or support bars 47a, 47b are shown on each respective cabinet 50, 51. The support bars 47a, 47b may be vertically adjusted for suitable positioning as depicted in FIG. 7.

Figure 8:
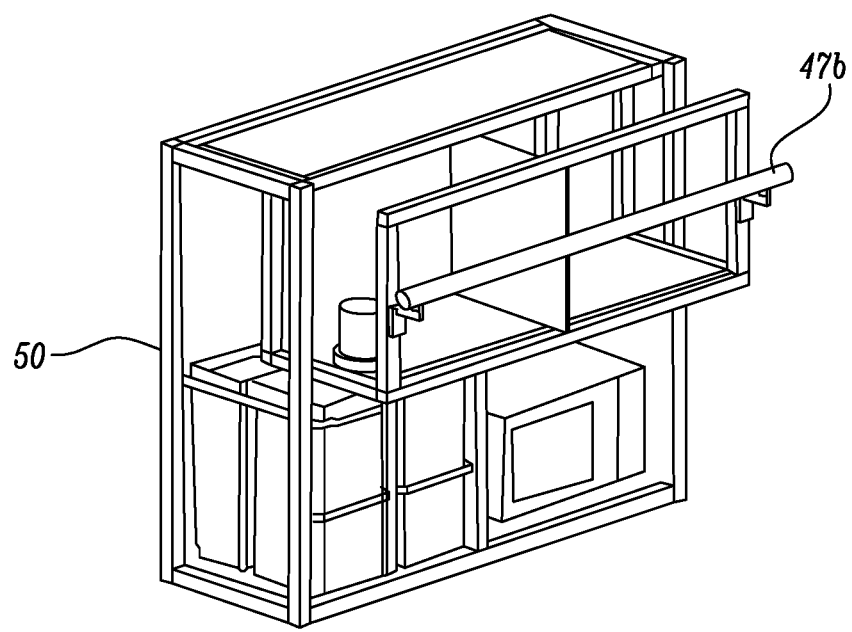
FIG. 8 depicts an interior view of a cabinet used with the mobile medical services system.
Figure 9:
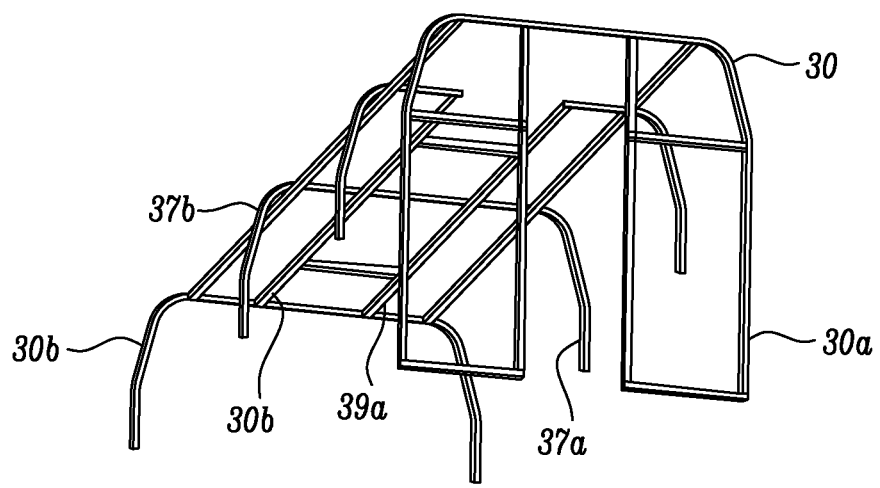
FIG. 9 depicts a frame system used with the mobile medical services system according to the present invention.

FIG. 8 shows the interior of a typical cabinet used in conjunction with the present invention. Cabinet 50 is shown with storage bins and other equipment, which is easily accessible through vertical movement of the components of the cabinet and the opening or closing of the panels provided on the cabinet 50. Similar arrangements may be suitable for the remaining cabinets of the present invention. FIG. 9 shows the frame assembly 30 according to the present invention, where the distal end 30a is shown in the foreground and is entry end 30b is shown in the background. The frame assembly 30 includes framing for the top of the medical services system along with support framing 37b, 37a that extend from the top of the frame assembly 30. Tracking down the middle of the frame assembly at the top area is a tracking system 39, which has individual tracks 39a, 39b.

Figure 10:
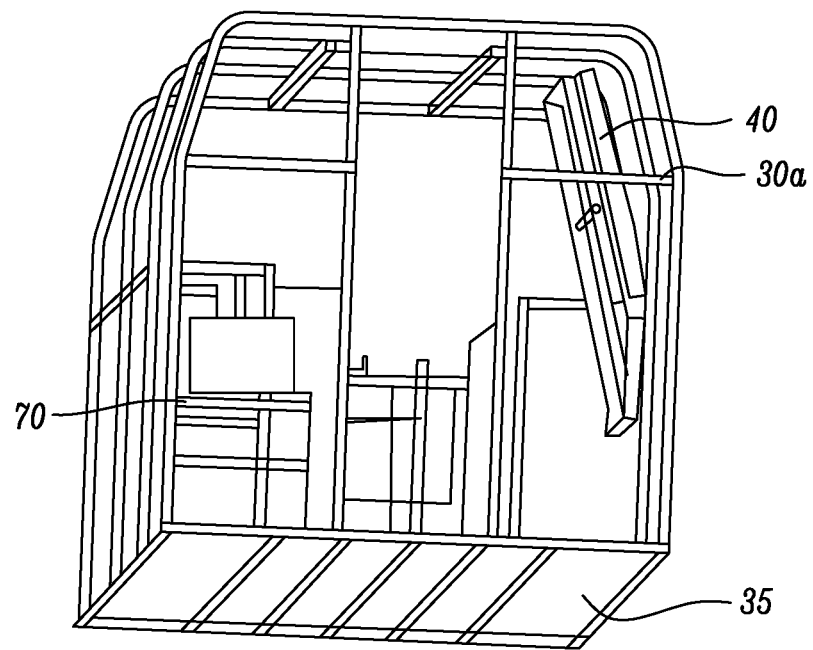
FIG. 10 depicts a second view of the frame system showing a bottom view of a floor of the mobile medical services system.

FIG. 10 shows the frame assembly 30 over therapy area with the interior equipment installed such as the flooring 35 that attaches to the bottom of frame 30, the examination table 40 attached to one side of the frame assembly 30 and some cabinets. This view is shown looking into the frame assembly 30 from the distal end 30a. As a result, the wheelchair 70 is shown in its storage area and the wheelchair lift 37 is shown in a vertical position.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. A system for delivering medical services in a mobile setting comprising:
   a frame assembly, where said frame assembly is mounted within an enclosed portable compartment, where the enclosed portable compartment includes an interior of at least one of a van, a medical coach and trailer;
   a plurality of tables convertibly integrated into the frame assembly;
   a plurality of cabinets integrated into the frame assembly;
   a grouping of training equipment removably engaged with the frame assembly; and
   a dedicated power system.

2. The system for delivering medical services according to claim 1, where the enclosed portable compartment includes an interior of a portable pod.

3. The system for delivering medical services according to claim 1, where the grouping of training equipment includes a convertible step assembly.

4. The system for delivering medical services according to claim 1, where the dedicated power system includes an auxiliary battery (DC) and invertor (AC).

5. The system for delivering medical services according to claim 1, further including an examination table engaged into the frame assembly, wherein said examination table includes a vertical position for storage and a horizontal position for use.

6. The system for delivering medical services according to claim 1, wherein the frame assembly includes an entry end and a distal end.

7. The system for delivering medical services according to claim 1, further including a wheelchair lift at the entry end.

8. The system for delivering medical services according to claim 1, further including a tracking system at the top of the frame assembly.

* * * * *